(12) United States Patent
Kaneda et al.

(10) Patent No.: US 7,378,005 B2
(45) Date of Patent: May 27, 2008

(54) ELECTRODE FOR ELECTROLYSIS AND METHOD OF MANUFACTURING ELECTRODE FOR ELECTROLYSIS

(75) Inventors: Kazuhiro Kaneda, Fukaya (JP); Mineo Ikematsu, Ibaraki (JP); Yurika Koizumi, Gunma (JP); Tsuyoshi Rakuma, Gunma (JP); Daizo Takaoka, Gunma (JP)

(73) Assignee: Sanyo Electric Co., Ltd., Osaka (JP)

( * ) Notice: Subject to any disclaimer, the term of this patent is extended or adjusted under 35 U.S.C. 154(b) by 351 days.

(21) Appl. No.: 11/206,299

(22) Filed: Aug. 18, 2005

(65) Prior Publication Data

US 2006/0042937 A1 Mar. 2, 2006

(30) Foreign Application Priority Data

Aug. 31, 2004 (JP) .............................. 2004-253351
Feb. 21, 2005 (JP) .............................. 2005-044742

(51) Int. Cl.
*C25B 11/04* (2006.01)
(52) U.S. Cl. ........................... 204/290.13; 204/290.01; 204/290.12; 204/290.14; 205/626; 205/758; 205/759; 205/760
(58) Field of Classification Search ............ 204/290.1, 204/290.12, 290.13, 290.14; 205/626, 758, 205/759, 760
See application file for complete search history.

(56) References Cited

U.S. PATENT DOCUMENTS 6,251,254 B1 * 6/2001 Katoh et al. ................ 205/287
2007/0034505 A1 * 2/2007 Ikematsu et al. .......... 204/280

FOREIGN PATENT DOCUMENTS

| JP | 11-077060 | 3/1999 |
| JP | 11-333475 | 12/1999 |
| JP | 2002-080986 | 3/2002 |

* cited by examiner

*Primary Examiner*—Bruce F Bell
(74) *Attorney, Agent, or Firm*—McDermott Will & Emery LLP

(57) ABSTRACT

An object is to provide an electrode for electrolysis which is preferable in generation of ozone water usable in cleaning and sterilizing of water and sewage, or cleaning in a semiconductor device manufacturing process by an electrolysis process, and a method of manufacturing this electrode for electrolysis. The surface of a conductive substrate constituting the electrode for electrolysis is coated with a noble metal such as platinum or a noble metal oxide to form an intermediate layer, further a surface layer is constituted of a dielectric material on the surface of the intermediate layer, and the surface layer is provided with holes.

9 Claims, 4 Drawing Sheets

FIG. 5

ELECTRODE FOR ELECTROLYSIS AND METHOD OF MANUFACTURING ELECTRODE FOR ELECTROLYSIS

TECHNICAL FIELD

The present invention relates to an electrode for electrolysis and a method of manufacturing an electrode for electrolysis.

BACKGROUND ART

Ozone is a substance having a very strong oxidizability, and water in which ozone is dissolved, so-called ozone water is expected to be utilized in a broad region of cleaning and sterilizing, such as sterilizing of water and sewage or food, and cleaning in a process of manufacturing a semiconductor device. As a method of generating the ozone water, there is known a method of dissolving in water the ozone generated by ultraviolet irradiation or electric discharge, or a method of generating the ozone in water by electrolysis of water.

In Japanese Patent Application Laid-Open No. 11-77060, there is described an ozone water generation device comprising: ozone generating means for generating an ozone gas by an ultraviolet lamp; and a water storage tank. When the generated ozone gas is supplied to the water in the tank, the ozone water is generated. In Japanese Patent Application Laid-Open No. 11-333475, there is described an ozone water generation device which mixes the ozone gas generated by an electric discharge type ozone gas generating device with the water at a predetermined ratio by a mixing pump in order to dissolve the ozone gas in the water with a good efficiency.

However, in the ozone water generating method of generating the ozone gas by the ultraviolet lamp or the electric discharge system as described above to dissolve the ozone gas in the water, there is required the ozone gas generating device or an operation for dissolving the ozone gas in the water, and the apparatus is easily complicated. In the method, since the generated ozone gas is dissolved in the water, there has been a problem that it is difficult to generate the ozone water having a desired concentration with a high efficiency.

In Japanese Patent Application Laid-Open No. 2002-80986, as a method which solves the above-described problem, there is described a method of generating the ozone in the water by the electrolysis of the water to obtain the ozone water. There are described an electrode for ozone generation comprising: an electrode base material constituted of a porous material or a net-like material; and an electrode catalyst containing an oxide of a platinum group element or the like, and ozone water manufacturing method and apparatus using this electrode for ozone generation.

The platinum group element is a standard anode material, and has a characteristic that the element is hardly dissolved in an aqueous solution which does not contain any organic material, but the element has an ozone generation efficiency which is insufficient for the electrode for ozone generation, and it is difficult to generate the ozone water by a high-efficiency electrolysis process. In the ozone water generation by the electrolysis process using such conventional electrode for ozone generation, the electrolysis at a high current density is required for the ozone generation, and there is a problem in energy consumption or electrode life.

An object of the present invention is to provide an electrode for electrolysis which is preferable in generation by an electrolysis process for ozone water usable in cleaning and sterilizing of water and sewage or food or cleaning in a process of manufacturing a semiconductor device, and a method of manufacturing the electrode for electrolysis.

SUMMARY OF THE INVENTION

According to the present invention, there is provided an electrode for electrolysis comprising: a substrate; an intermediate layer formed on the surface of the substrate and containing at least one of a noble metal, an alloy containing the noble metal, and a noble metal oxide; and a surface layer formed on the surface of the intermediate layer and containing a dielectric material, the substrate, the intermediate layer, and the surface layer being formed into a layered formation, wherein the surface layer is provided with holes which pass through the surface layer and one end of each of which reaches the intermediate layer.

Moreover, according to the present invention, in the electrode for electrolysis of the above-described embodiment, the substrate is a conductive substrate, and the holes do not reach the conductive substrate.

Furthermore, according to the present invention, in the electrode for electrolysis of the invention, the dielectric material included in the surface layer is an oxide.

Additionally, according to the present invention, in the electrode for electrolysis of the invention, the oxide is tantalum oxide, aluminum oxide, titanium oxide, or tungsten oxide.

Moreover, according to the present invention, in the electrode for electrolysis of the invention, the noble metal is a platinum group element.

Furthermore, according to the present invention, in the electrode for electrolysis of the invention, the intermediate layer and/or the surface layer is constituted of a plurality of layers.

According to the present invention, in order to manufacture the electrode for electrolysis according to each of the above-described inventions, there is provided a method of manufacturing an electrode for electrolysis, comprising a first step of coating the surface of the substrate with an intermediate layer constituting material for forming the intermediate layer, and thermally treating the substrate and the intermediate layer constituting material to thereby form the intermediate layer on the surface of the substrate; and a second step of coating the surface of the intermediate layer with a surface layer constituting material for forming the surface layer, and thermally treating the substrate, the intermediate layer, and the surface layer constituting material in an oxidizing atmosphere to thereby form the surface layer on the surface of the intermediate layer.

Moreover, according to the method of manufacturing the electrode for electrolysis of the present embodiment, in the above-described method of manufacturing the electrode for electrolysis, the thermal treatment in the second step is performed at a temperature higher than that of the thermal treatment in the first step.

According to the present invention, there are provided the electrode for electrolysis which can efficiently generate ozone by electrolysis and a method of manufacturing this electrode for electrolysis.

DETAILED DESCRIPTION OF THE EMBODIMENTS

A preferable embodiment of an electrode for electrolysis will be described hereinafter with reference to the drawings according to the present invention.

Figure 1A:
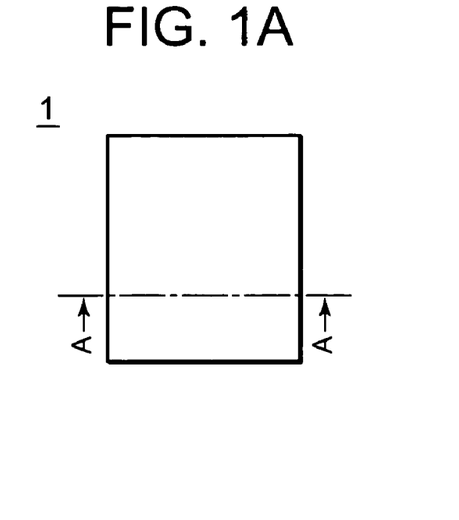
FIG. 1 is a schematic diagram of an electrode for ozone generation according to one embodiment of the present invention.
Figure 1B:
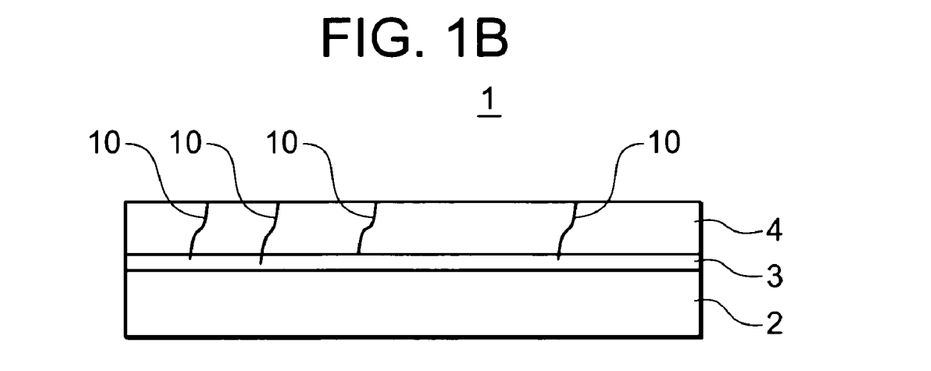

FIG. 1 is a schematic diagram showing an electrode 1 for ozone generation as one example of an electrode for electrolysis according to the present invention, FIG. 1(a) is a plan view of the electrode 1 for ozone generation, and FIG. 1(b) is an enlarged A-A sectional view schematically showing the electrode 1 for ozone generation.

As shown in FIG. 1, in the electrode 1 for ozone generation, an intermediate layer 3 is formed on a conductive substrate 2 as a substrate of the electrode 1 for ozone generation, and a surface layer 4 is formed on this intermediate layer 3.

The conductive substrate 2 is constituted of valve metals such as titanium, tantalum, zirconium, and niobium, an alloy of two or more of these valve metals, silicon or the like, and titanium is preferably used in consideration of cost, workability, resistance to corrosion and the like.

A noble metal, an alloy containing the noble metal, or a noble metal oxide is used in the intermediate layer 3. As the noble metal, a platinum group element is used such as platinum (Pt), ruthenium (Ru), rhodium (Rh), palladium (Pd), or iridium (Ir), or gold, silver or the like is used. As the noble metal oxide, iridium oxide, palladium oxide, ruthenium oxide or the like is used.

Figure 1C:
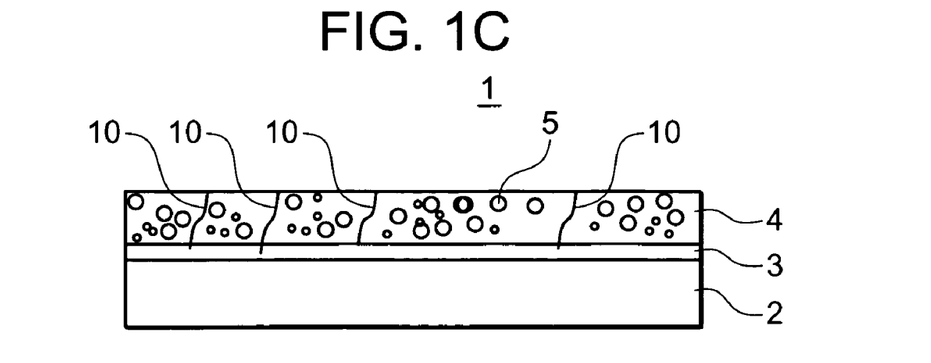

The surface layer 4 is constituted into a layered formation in such a manner as to cover the intermediate layer 3, and this surface layer 4 is formed of a dielectric material. As this dielectric material, tantalum oxide, aluminum oxide, titanium oxide, tungsten oxide, niobium oxide or the like is used. It is to be noted that as shown in FIG. 1(b), in the electrode 1 for ozone generation of the present invention, the surface layer 4 may be constituted of the dielectric material only, but in addition to the dielectric material, as shown in FIG. 1(c), the surface layer may contain a noble metal such as platinum 5 or a noble metal oxide in the same manner as in the intermediate layer 3.

Moreover, the surface layer 4 may be an oxide containing two or more types of metal elements represented by a perovskite type oxide such as barium titanate ($BaTiO_3$), or a mixed article of two or more types of oxides having different crystal structures such as titanium oxide and tantalum oxide. In this case, in addition to these oxides, it is possible to use a material containing the above-described noble metal or noble metal oxide.

Here, tantalum oxide refers to a general substance constituted by combining tantalum and oxygen: crystalline TaO or $Ta_2O_5$; this oxide in which a slight oxygen vacancy is generated, such as $TaO_{1-x}$ or $Ta_2O_{5-x}$; amorphous $TaO_x$ or the like. Aluminum oxide refers to $Al_2O_3$, $AlO_x$ or the like, titanium oxide refers to $TiO_2$, $Ti_2O_3$, $TiO_x$ or the like, and tungsten oxide refers to $WO_3$, $WO_x$ or the like. It is to be noted that other examples of the applicable dielectric material forming the surface layer 4 include $Na_2O$, $NaO_x$, $MgO$, $MgO_x$, $SiO_2$, $SiO_x$, $K_2O$, $KO_x$, $CaO$, $CaO_x$, $Sc_2O_3$, $ScO_x$, $V_2O_5$, $VO_x$, $CrO_2$, $CrO_x$, $Mn_3O_4$, $MnO_x$, $Fe_2O_3$, $FeO_x$, $CoO$, $CoO_x$, $NiO$, $NiO_x$, $CuO$, $CuO_x$, $ZnO$, $ZnO_x$, $GaO$, $GaO_x$, $GeO_2$, $GeO_x$, $Rb_2O_3$, $RbO_x$, $SrO$, $SrO_x$, $Y_2O_3$, $YO_x$, $ZrO_2$, $ZrO_x$, $Nb_2O_5$, $NbO_x$, $MoO_3$, $MoO_x$, $In_2O_3$, $InO_x$, $SnO_2$, $SnO_x$, $Sb_2O_5$, $SbO_x$, $Cs_2O_5$, $CsO_x$, $BaO$, $BaO_x$, $La_2O_3$, $LaO_x$, $CeO_2$, $CeO_x$, $PrO_2$, $PrO_x$, $Nd_2O_3$, $NdO_x$, $Pm_2O_3$, $PmO_x$, $Sm_2O_3$, $SmO_x$, $Eu_2O_3$, $EuO_x$, $Gd_2O_3$, $GdO_x$, $Tb_2O_3$, $TbO_x$, $Dy_2O_3$, $DyO_x$, $Ho_2O_3$, $HoO_x$, $Er_2O_3$, $ErO_x$, $Tm_2O_3$, $TmO_x$, $Yb_2O_3$, $YbO_x$, $Lu_2O_3$, $LuO_x$, $HfO_2$, $HfO_x$, $PbO_2$, $PbO_x$, $Bi_2O_3$, $BiO_x$ and the like.

Embodiment 1

Figure 2:
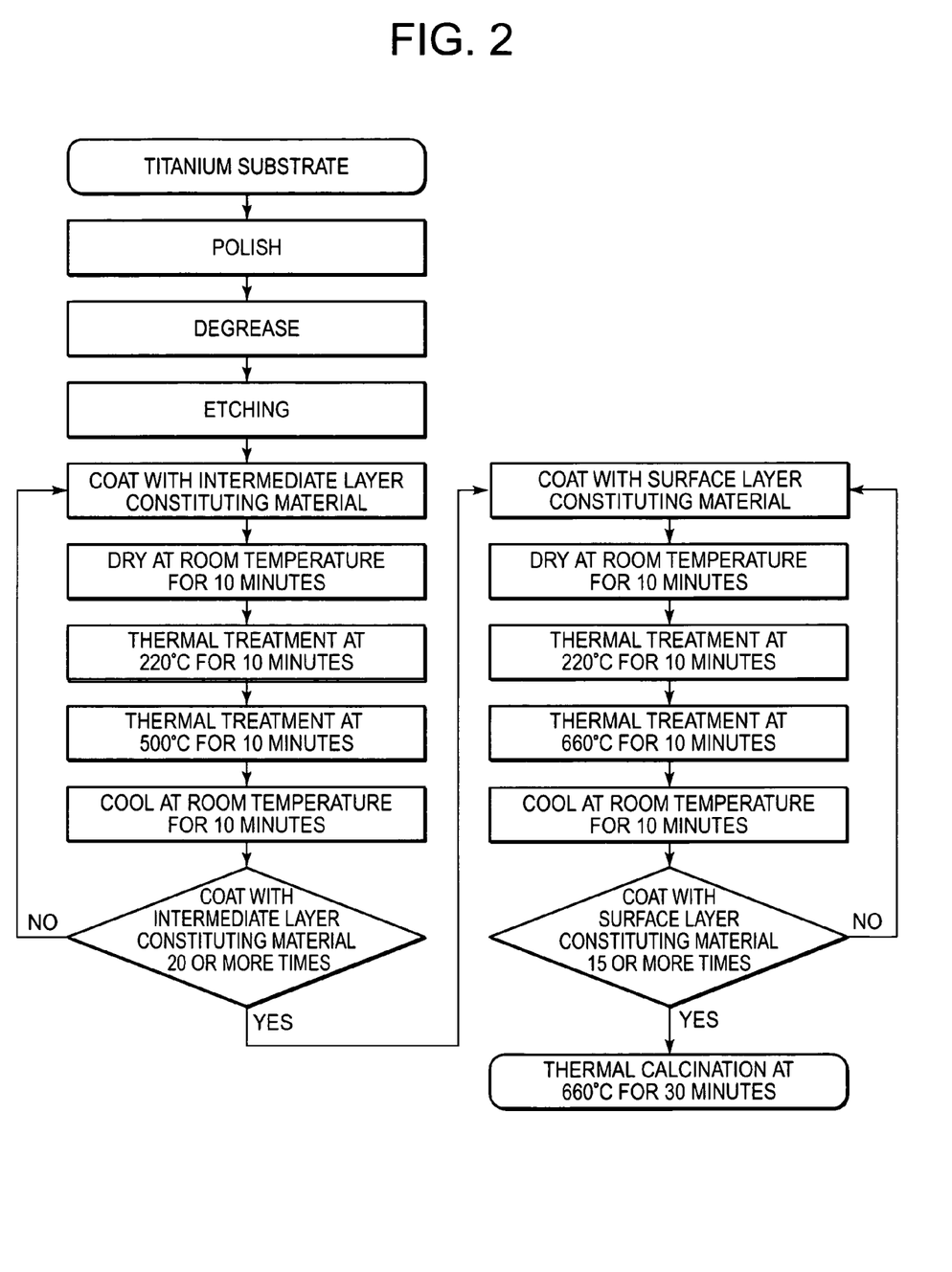
FIG. 2 is a flowchart of a method of manufacturing the electrode for ozone generation according to one embodiment of the present invention.

Next, one embodiment of an electrode for electrolysis will be described with reference to the drawings according to the present invention. FIG. 2 shows a flowchart of a method of manufacturing an electrode 1 for ozone generation according to the present embodiment. In this manufacturing method, an intermediate layer 3 is formed to cover the surface of a conductive substrate 2, and further a surface layer 4 is formed to cover the surface of the intermediate layer 3.

First, a titanium plate having a thickness of 1 mm, a length of 80 mm, and a width of 20 mm is used as the conductive substrate 2, and the surface (surface formed into a length of 80 mm and a width of 20 mm) of the conductive substrate 2 is polished with sandpaper. It is to be noted that in the electrode 1 for ozone generation of the present embodiment, the only one surface of the conductive substrate 2 is coated with the intermediate layer 3 and the surface layer 4, and this surface layer 4 is disposed facing a counter electrode, and used as a reactive surface in electrolysis. For example, when the electrode 1 for ozone generation of the present invention is used in a bipolar type of electrolysis device or the like, it is possible to form the intermediate layer 3 and the surface layer 4 on opposite or all surfaces of the conductive substrate 2. In this case, manufacturing steps such as polishing of the surface of the conductive substrate 2, and etching and thermal treating described later are performed with respect to the opposite or all surfaces of the conductive substrate 2.

Moreover, the surface of the conductive substrate 2 may be polished in such a manner as to remove an oxide film formed on the surface of the conductive substrate 2, the present invention is not limited to the method by the sandpaper, and any method may be used as long as an effect similar to that of sand blasting or the like is obtained.

Next, the conductive substrate 2 whose surface has been polished is degreased with an organic solvent, acetone in the present embodiment. Thereafter, the etching is performed using a heat oxalic acid aqueous solution having a concentration of 200 g/l for three hours in the present embodiment until a predetermined surface roughness is obtained. It is to be noted that, for example, heat sulfuric acid, hydrofluoric acid or the like may be used instead of the heat oxalic acid aqueous solution.

First, the intermediate layer 3 is formed on the conductive substrate 2 whose surface has been roughened by the etching. To form the intermediate layer 3 of platinum in the electrode 1 for ozone generation of the present embodiment, platinum hexachloride hexahydrate having such an amount as to indicate a platinum concentration of 50 g/l is dissolved in a solvent adjusted in such a manner that a mixture ratio of isopropyl alcohol and ethylene glycol monoethyl ether is 4:1, thereby forming an intermediate layer constituting material.

Moreover, the surface of the conductive substrate 2 is uniformly coated with the intermediate layer constituting material by use of a spatula (not shown). It is to be noted that in addition to the above-described coating method using the spatula, examples of the coating method with this intermediate layer constituting material include: a method of coating the conductive substrate 2 with the intermediate layer constituting material by spraying (not shown); a method of containing the intermediate layer constituting material in a container (not shown) to immerse the conductive substrate 2 into the container; a method (spin coating) of rotating the conductive substrate 2 to coat the substrate with the intermediate layer constituting material by a centrifugal force and the like.

The conductive substrate 2 to whose surface the intermediate layer constituting material is attached is next dried at room temperature for ten minutes, and thereafter thermally treated in a temperature range of +150° C. to +250° C., preferably at 220° C. for ten minutes. Furthermore, a thermal treatment is performed in a temperature range of +400° C. to +550° C., preferably at 500° C. for ten minutes. Accordingly, solvent components and the like are evaporated, and the intermediate layer 3 formed of platinum is formed on the surface of the conductive substrate 2.

Moreover, the conductive substrate 2 on which the intermediate layer 3 has been formed is cooled at room temperature for ten minutes. Thereafter, as shown in FIG. 2, steps of the coating with the intermediate layer constituting material, drying at room temperature, thermal treatment at +220° C., thermal treatment at 500° C., and cooling at room temperature are repeated again until a thickness of the intermediate layer 3 reaches a predetermined thickness. It is to be noted that in the electrode 1 for ozone generation of the present embodiment, the above-described steps are repeated 20 times so that the thickness of the intermediate layer 3 is about 100 nm on average.

When the step of preparing the intermediate layer 3 is repeated a plurality of times in this manner, the conductive substrate 2 can be coated with platinum in appropriate thickness and amount and with a satisfactory in-surface uniformity as compared with a case where a large amount of intermediate layer constituting material is constituted on the surface of the conductive substrate 2 at once. Moreover, it is possible to form the intermediate layer 3 having high adhesion, and durability of the electrode can be improved. Since the thickness of the intermediate layer can be easily obtained in accordance with the durability required in the electrode, a use amount of the noble metal or the noble metal oxide can be set to be appropriate, and wasting of the noble metal and the noble metal oxide can be reduced.

Thereafter, the surface layer 4 constituted of a dielectric material is formed on the surface of the intermediate layer 3 formed on the surface of the conductive substrate 2. To form the surface layer 4 of tantalum oxide which is the dielectric material in the electrode 1 for ozone generation of the present embodiment, tantalum ethoxide having such an amount as to indicate a tantalum concentration of 1.45 mol/l is dissolved in a solvent adjusted in such a manner that a mixture ratio of n-butyl acetate and dimethyl formamide is 95:5, thereby forming a surface layer constituting material.

It is to be noted that in addition to the dielectric material, as described above, the surface layer 4 may contain the noble metal or the noble metal oxide in the same manner as in the intermediate layer 3. In this case, for example, when platinum is used as the noble metal, platinum hexachloride hexahydrate and tantalum ethoxide similar to them used in the intermediate layer constituting material are dissolved in a solvent adjusted in such a manner that a mixture ratio of isopropyl alcohol and ethylene glycol monoethyl ether is 4:1 so that a total concentration of platinum and tantalum is 1.45 mol/l. As described later, the mixture ratio of platinum and tantalum is set preferably for the electrode for oxide generation in such a manner that a content of tantalum is 75 mol % or more and a remaining portion is platinum as to a constituting ratio of tantalum oxide and platinum in the surface layer 4. It is to be noted that the surface layer 4 contains oxygen in addition to tantalum and platinum described above, and the content of tantalum mentioned hereinafter in the present invention refers to a ratio (mol %) occupied by tantalum with respect to a total amount of tantalum and platinum excluding oxygen in the surface layer 4.

Moreover, the surface of the intermediate layer 3 formed on the surface of the conductive substrate 2 is uniformly coated with the surface layer constituting material by use of the spatula in the same manner as in the coating method with the intermediate layer constituting material for forming the intermediate layer 3. It is to be noted that even in the coating with the surface layer constituting material, in the same manner as in the coating with the intermediate layer constituting material, in addition to the coating method using the spatula, there may be performed: a coating method with the surface layer constituting material by spraying (not shown); a method of containing the surface layer constituting material in a container (not shown) to immerse the conductive substrate 2 into the container; a method of rotating the conductive substrate 2 to coat the substrate with the surface layer constituting material by a centrifugal force and the like.

As to the conductive substrate 2 in which the surface layer constituting material is attached to the surface of the intermediate layer 3 in this manner, the surface layer 4 is formed by a preparing step substantially similar to that for forming the intermediate layer 3 as described above.

That is, the conductive substrate 2 including the surface layer constituting material attached to the surface of the intermediate layer 3 is dried at room temperature for ten minutes, and thereafter thermally treated in a temperature range of +150° C. to +250° C., preferably at 220° C. for ten minutes. Further in preparing the surface layer 4, a thermal treatment is next performed in a temperature range of +600° C. to +700° C., preferably at 660° C. which is higher than the temperature of the thermal treatment of the intermediate layer 3, for ten minutes. Accordingly, the surface layer 4 constituted of tantalum oxide or tantalum oxide and platinum is formed on the surface of the intermediate layer 3 formed on the surface of the conductive substrate 2.

Moreover, the conductive substrate 2 on which the surface layer 4 has been formed is cooled at room temperature for ten minutes. Thereafter, as shown in FIG. 2, steps of the coating with the surface layer constituting material, drying at room temperature, thermal treatment at +220° C., thermal treatment at 660° C., and cooling at room temperature are repeated again until a thickness of the surface layer 4 reaches a predetermined thickness. In the electrode 1 for ozone generation of the present embodiment, the above-described steps are repeated 15 times so that the thickness of the surface layer 4 is about 0.5 to 2 μm, preferably about 1.2 μm on average. Accordingly, the surface layer 4 is formed further on the surface of the intermediate layer 3 formed on the surface of the conductive substrate 2, and the electrode 1 for ozone generation of the present invention is prepared.

It is to be noted that in the present embodiment, a time required in the last 15th thermal treatment is set to 30 minutes in the thermal treatment of the surface layer 4 at +660° C. This can prevent the solvent remaining on the surface of the prepared electrode 1 for ozone generation, shortage of the thermal treatment of the intermediate layer 3 and surface layer 4, thermal treatment unevenness and the like.

Moreover, in the electrode 1 for ozone generation, since the step of preparing the surface layer 4 as described above is repeated a plurality of times in the same manner as in the step of preparing the intermediate layer 3, the surface can be coated with tantalum in appropriate thickness and amount and with a satisfactory in-surface uniformity as compared with a case where a large amount of surface layer constituting material is constituted on the surface of the intermediate layer 3 at once. Moreover, it is possible to form the surface layer 4 having high adhesion, and the durability of the electrode can further be improved.

Further in the method of manufacturing the electrode 1 for ozone generation in the present embodiment, since the thermal treatment temperature (+660° C.) of the surface layer 4 is set to be higher than that (+500° C.) of the intermediate layer 3, tantalum oxide constituting the surface layer 4 can be crystallized. When tantalum oxide is crystallized in this manner, an inner stress in the surface layer 4 increases, and holes 10, so-called cracks are formed in the surface layer 4. It is to be noted that since the surface of the intermediate layer 3 is repeatedly coated with the surface layer 4 a plurality of times in forming the surface layer as described above, the holes 10 are constituted while a large number of cracks repeat branching and combining in a complicated manner in the surface layer 4.

Moreover, in the electrode 1 for ozone generation of the present embodiment, the intermediate layer 3 is constituted by the coating with the intermediate layer constituting material a plurality of times as described above, and the intermediate layer 3 and the surface layer 4 are formed at the thermal treatment temperatures described above. Therefore, the holes 10 pass through the surface layer 4, and reach an interface between the surface layer and the intermediate layer 3, but do not reach the conductive substrate 2. It is possible to avoid a disadvantage that the conductive substrate 2 is corroded during the electrolysis.

Accordingly, as described in the present embodiment, since the holes 10 pass through the surface layer 4 to reach the intermediate layer 3, conductivity of the electrode can be secured even in a case where the surface layer 4 is constituted of the dielectric material (insulator) only. When the surface layer 4 is constituted of the dielectric material only in this manner, the use of the noble metal or the noble metal oxide in the surface layer 4 can be reduced, and costs can be reduced.

It is to be noted that it has been described in the present embodiment that the conductive substrate 2 is used as the substrate of the electrode 1 for ozone generation, but the present invention is not limited to the present embodiment, and a ceramic substrate constituted of alumina, silica or the like may be used as a substrate other than the conductive substrate 2. In a case where the ceramic substrate is used in the substrate in this manner, even when the holes 10 pass through the surface layer 4 and further the intermediate layer 3, and one end of each of the holes 10 reaches the ceramic substrate, the substrate can be prevented from being corroded unlike a case where the conductive substrate 2 is used as the substrate.

Figure 3:
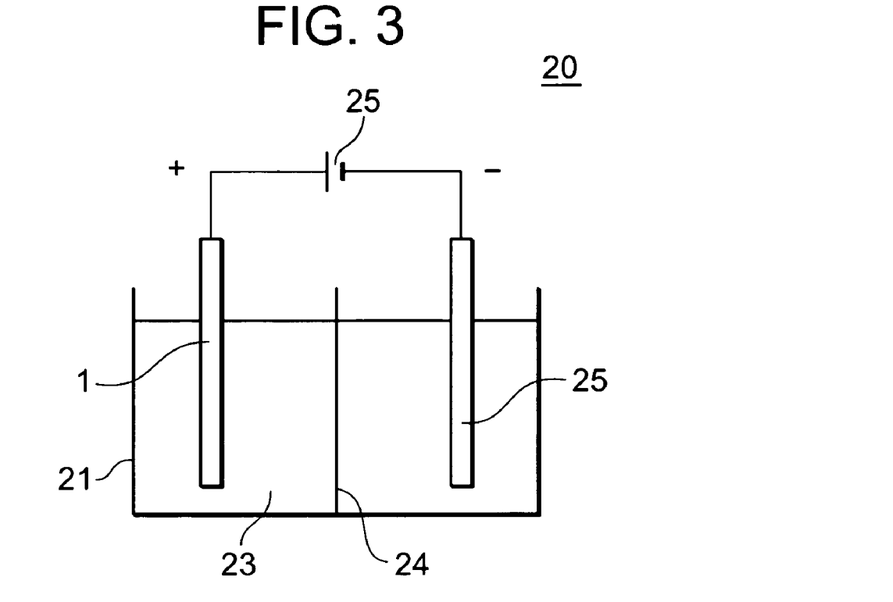
FIG. 3 is a schematic diagram of an ozone water generation device according to one embodiment of the present invention.

Here, ozone generation will be described by the electrolysis using the electrode 1 for ozone generation of the present embodiment. FIG. 3 is a schematic diagram of an ozone water generation device 20 to which the electrode 1 for ozone generation of the present embodiment is applied. The ozone water generation device 20 is provided with: a treatment tank 21; model tap water 23 as an electrolytic solution stored in the treatment tank 21; the electrode 1 for ozone generation as an anode; an electrode 22 as a cathode; a cation exchange film 24 which partitions the inside of the treatment tank 21 on anode and cathode sides; and a power supply 25 for energizing the electrode 1 for ozone generation and the electrode 22.

The electrode 1 for ozone generation is prepared by the above-described manufacturing method. As to the electrode 1 for ozone generation for use in the ozone water generation device 20, there are 15 types in total whose tantalum contents in the surface layer 4 are 0 mol %, 10 mol %, 20 mol %, 30 mol %, 40 mol %, 50 mol %, 60 mol %, 70 mol %, 75 mol %, 80 mol %, 85 mol %, 90 mol %, 95 mol %, 99 mol %, and 100 mol %. In a case where these electrodes 1 for ozone generation are used as anodes, ozone generation amounts are measured, and accordingly the 15 types of electrodes 1 for ozone generation are evaluated. It is to be noted that a portion other than tantalum oxide in the surface layer 4 of each of the 15 types of electrodes 1 for ozone generation is constituted of platinum and oxygen as described above.

On the other hand, platinum plate is used in the electrode 22 as the cathode, but in addition, the electrode may be constituted of an insoluble electrode constituted by calcinating platinum on the titanium substrate surface, a platinum-iridium based electrode, a carbon electrode or the like.

Moreover, the model tap water 23 as the electrolytic solution for use in the present embodiment is an aqueous solution simulating city water, and a component composition of this model tap water 23 is shown in Table 1.

TABLE 1

| | Component | | | | | | |
|---|---|---|---|---|---|---|---|
| | $Na^+$ | $Ca^{2+}$ | $Mg^{2+}$ | $K^+$ | $Cl^-$ | $SO_4^{2-}$ | $CO_3^{2-}$ |
| Concentration (ppm) | 5.75 | 10.02 | 6.08 | 0.98 | 17.75 | 24.5 | 16.5 |

According to the above-described constitution, 150 ml of model tap water 23 is stored on each of the anode and cathode sides partitioned by the cation exchange film 24 at water temperature of 15° C., and 300 ml in total is stored in the treatment tank 21. Moreover, the electrode 1 for ozone generation and the electrode 22 is immersed into the model tap water on the anode and cathode sides between which the cation exchange film 24 is sandwiched. It is to be noted that in the present embodiment, an area of each of the electrode 1 for ozone generation and the electrode 22 is 80 mm×20 mm (immersed portion 40 mm×20 mm), and a distance between the electrodes is 10 mm. Moreover, a constant current of 150 mA having a current density of 18.8 mA/cm$^2$ is applied to the electrode 1 for ozone generation and the electrode 22 by the power supply 25.

It is to be noted that in the present embodiment, as to the ozone generation amount by the electrode 1 for ozone generation, an ozone concentration in the model tap water 23 after the electrolysis for one minute is measured using a calorimetric method on the above-described conditions.

Figure 4:
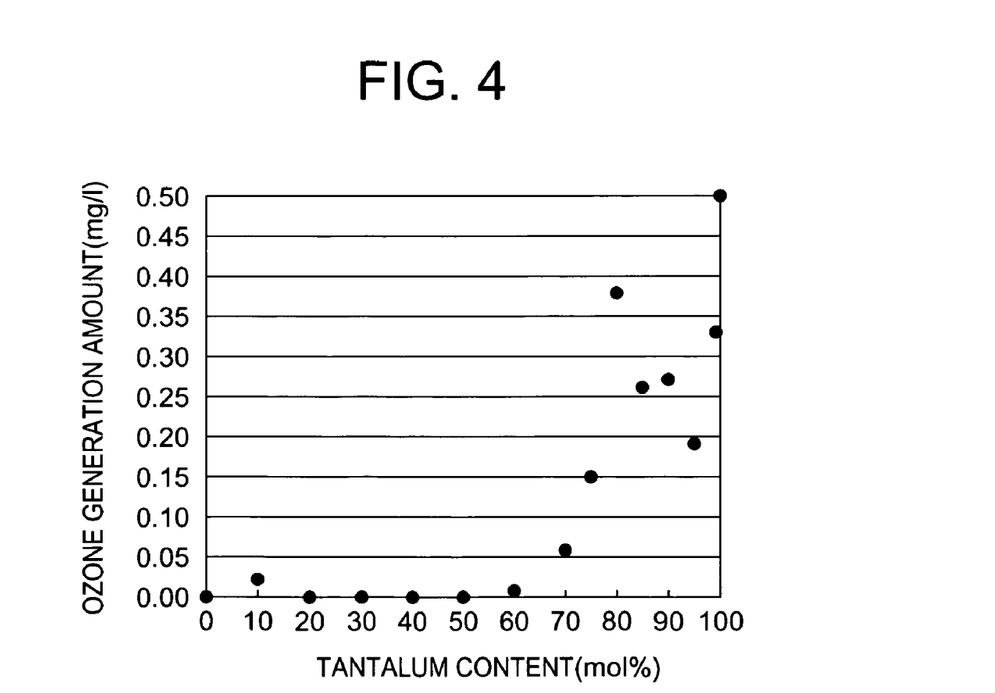
FIG. 4 is a diagram showing an ozone generation amount for each content of tantalum contained in a surface layer of an electrode for electrolysis according to one embodiment of the present invention in the ozone water generation device of FIG. 3.

Next, the ozone generation amount will be described with respect to the content of tantalum oxide of the surface layer 4 in the electrode 1 for ozone generation of the present embodiment with reference to FIG. 4. FIG. 4 shows the ozone generation amount of each of 15 types of electrodes 1 for ozone generation on the same conditions. In FIG. 4, the ordinate indicates the ozone generation amount (mg/l), and the abscissa indicates the content of tantalum in the surface layer 4 of the electrode 1 for ozone generation.

As seen from FIG. 4, when the content of tantalum in the surface layer 4 of the electrode 1 for ozone generation is less than 70 mol %, the ozone generation amount is very small, but the ozone generation amount rapidly increases in a case where the tantalum content is 70 mol % or more. In experiment results, the ozone generation amount indicates 0.06 mg/l at a content of 70 mol %, 0.15 mg/l at a content of 75 mol %, 0.38 mg/l at a content of 80 mol %, 0.26 mg/l at a content of 85 mol %, 0.27 mg/l at a content of 90 mol %, 0.19 mg/l at a content of 95 mol %, 0.33 mg/l at a content of 99 mol %, and 0.50 mg/l at a content of 100 mol %. It is to be noted that when the content is 0 mol %, that is, when the surface layer 4 of the electrode 1 for ozone generation is all formed of platinum, any ozone generation is not observed on the conditions of the present embodiment.

As described above, when the tantalum content is 80 mol % or more, the ozone generation amount tends to be substantially saturated, but a largest ozone generation amount is indicated in a case where the content is 100 mol %.

Moreover, since the ozone generation amount is large in a case where the content of tantalum constituting the dielectric material is 70 mol % or more, especially 80 mol % or more in the surface layer 4 of the electrode 1 for ozone generation, and the largest ozone generation amount is indicated especially in a case where the content is 100 mol %, it is seen that the ozone generation is largely influenced and the ozone generation amount is increased by tantalum oxide in the surface layer 4 of the electrode 1 for ozone generation in the present embodiment.

It is to be noted that usually in the present embodiment, the conductivity of the electrode is not large enough to achieve electrolysis when all the electrode surfaces are covered only with the dielectric material as in a case where the tantalum content is 100 mol %, but the electrode 1 for ozone generation of the present embodiment has the holes 10 in the surface layer 4 as described above. The holes 10 constitute paths of a current, ions constituting an electrolyte flows through the holes via the intermediate layer 3 which is formed under the surface layer 4 and which is constituted of the noble metal or the noble metal oxide, and the holes function as the electrodes.

Moreover, in this electrode 1 for ozone generation, electrons are transmitted and received in a small area of a surface portion connected to each hole 10 of the intermediate layer 3 via each hole 10 which is the current path in the surface layer 4 as described above. Therefore, it is considered that the current density of platinum rises in the portion of the intermediate layer 3 connected to each hole 10, and the ozone generation amount increases even with little input current by a catalytic function of tantalum oxide around the holes 10 of the surface layer 4.

It is to be noted that as to the solvents for use in the intermediate layer constituting material and the surface layer constituting material described in the method of manufacturing the electrode 1 for ozone generation of the present embodiment, there have been described the solvent adjusted in such a manner that the mixture ratio of isopropyl alcohol and ethylene glycol monoethyl ether is 4:1 and the source adjusted in such a manner that the mixture ratio of n-butyl acetate and dimethyl formamide is 95:5, respectively. The solvents are not limited to these examples as long as platinum hexachloride hexahydrate and tantalum ethoxide constituting the intermediate layer 3 and the surface layer 4 can be dissolved. Furthermore, as to the platinum chloride hexahydrate and tantalum ethoxide, the present invention is not limited to the present embodiment as long as the electrode 1 for ozone generation of the present invention can be constituted, and a use amount can be increased/decreased if necessary.

Embodiment 2

Next, another embodiment of the present invention will be described with reference to FIG. 1. An electrode 1 for ozone generation in the present embodiment is different from that of the first embodiment in that aluminum oxide, titanium oxide, or tungsten oxide is used instead of tantalum oxide in the surface layer 4 of the first embodiment.

It is to be noted that in the first embodiment, to form the surface layer 4 of tantalum oxide, the surface layer constituting material is obtained by dissolving tantalum ethoxide having such an amount as to indicate a tantalum concentration of 1.45 mol/l in the solvent adjusted in such a manner that the mixture ratio of n-butyl acetate and dimethyl formamide is 95:5. On the other hand, to form the surface layer 4 of aluminum oxide in the present embodiment, isoamyl acetate is used as a solvent, and an aluminum (Al) containing organic metal is dissolved in the solvent to form a surface constituting material. In a case where the surface layer 4 is formed of titanium oxide, n-butyl acetate is used as the solvent, and a titanium (Ti) containing organic metal is dissolved in the solvent to form the surface constituting material. Furthermore, in a case where the surface layer 4 is formed of tungsten (W) oxide, a mixture of xylene and n-butyl acetate is used as the solvent, and a W containing organic metal is dissolved in the solvent to form the surface constituting material.

Moreover, in a method of manufacturing the electrode 1 for ozone generation in the first embodiment, the conductive substrate 2 including the surface layer constituting material attached to the surface of the intermediate layer 3 is dried at room temperature for ten minutes, and thereafter thermally treated at +220° C. for ten minutes. Next, a thermal treatment is performed at +660° C. for ten minutes. Furthermore, this step is repeated 15 times. On the other hand, in the present embodiment, the conductive substrate 2 including the surface layer constituting material attached to the surface of the intermediate layer 3 is dried at room temperature for ten minutes, and thereafter thermally treated at +220° C. for ten minutes. Next, the thermal treatment is performed at +600° C. or +650° C. for ten minutes (hereinafter referred to as the surface layer thermal treatment). Furthermore, this step is repeated 20 times.

Next, ozone generation will be described by electrolysis using the electrode 1 for ozone generation of the present embodiment with reference to FIG. 3. In this case, description of the ozone generation is similar to that of the first embodiment except that the electrode 1 for ozone generation differs in the treatment tank 21.

In the present embodiment, as the electrode 1 for ozone generation, electrodes are evaluated in which three types of conductive substrates 2 including the surface layer constituting materials attached to the surfaces of the intermediate layers 3 are subjected to the surface layer thermal treatment at +600° C. or +650° C. It is to be noted that in the surface layer 4 of the electrode 1 for ozone generation of the present embodiment, each of contents of aluminum oxide, titanium oxide, and tungsten oxide is 100 mol %.

Figure 5:
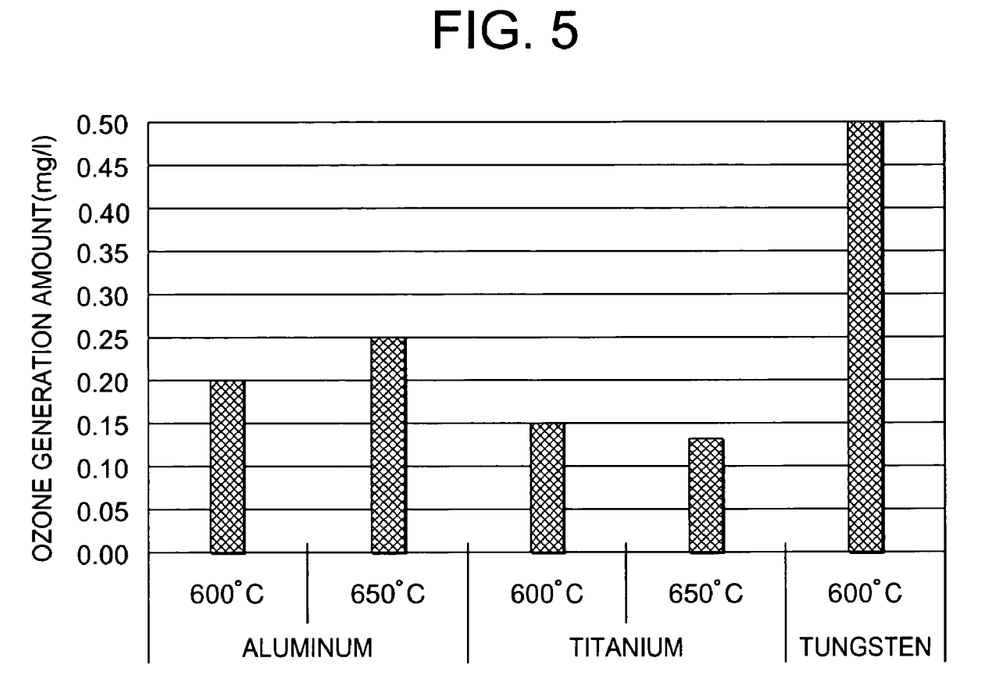
FIG. 5 is a diagram showing the ozone generation amount in the electrode for ozone generation according to another embodiment of the present invention.

FIG. 5 shows ozone generation amounts of the respective electrodes 1 for ozone generation in the present embodiment. FIG. 5 shows the ozone generation amounts in three types (aluminum oxide, titanium oxide, tungsten oxide as the surface layers 4) of electrodes 1 for ozone generation of the present embodiment on the same conditions, in which the temperatures of the surface layer thermal treatments of aluminum oxide and titanium oxide are +600° C. and +650° C., respectively, and the temperature of the surface layer thermal treatment of tungsten oxide is +600° C.

As shown in FIG. 5, the ozone generation amount indicates 0.20 mg/l at a temperature of +600° C. of the surface layer thermal treatment, and 0.25 mg/l at a temperature of 650° C. in a case where aluminum oxide is used as the surface layer 4. The ozone generation amount indicates 0.15 mg/l at a temperature of +600° C. of the surface layer thermal treatment, and 0.13 mg/l at a temperature of 650° C. in a case where titanium oxide is used as the surface layer 4. Furthermore, the ozone generation amount indicates 0.50 mg/l at a temperature of +600° C. of the surface layer thermal treatment in a case where tungsten oxide is used as the surface layer 4.

Furthermore, even in the present embodiment, in the same manner as in the first embodiment, the present invention is not limited to the above-described solvents for use in the intermediate layer and surface layer constituting materials, and Al, Ti, and W dissolved in the solvents as long as the electrode 1 for ozone generation of the present invention can be constituted.

As described above in detail, by the electrolysis of the model tap water by the electrode 1 for ozone generation of the present invention, ozone can be generated without especially raising a current value. Therefore, the ozone can be easily generated by the electrolysis, and oxide water can be easily generated.

Moreover, the above-described insoluble electrode has been used as the cathode in each of the above-described embodiments, but the electrode 1 for ozone generation of the present invention may be used in the cathode. In this case, since both of the electrodes are constitute of the electrodes 1 for ozone generation, polarities of the anode and cathode may be switched. When the polarity is switched in this manner, polluted substances or the like attached to each electrode surface is peeled, and the electrode surface is refreshed. Consequently, an ozone generation efficiency is further enhanced.

It is to be noted that the holes 10 formed in the surface layer 4 of the electrode 1 for ozone generation in each embodiment are formed as the cracks by the thermal treatment in the preparation of the electrode 1 for ozone generation in each embodiment. The present invention is not limited to this embodiment, and the holes may be formed, for example, by physical working using a machine or the like.

What is claimed is:

1. An electrode for electrolysis comprising: a substrate; an intermediate layer formed on the surface of the substrate and containing at least one of a noble metal, an alloy containing the noble metal, and a noble metal oxide; and a surface layer formed on the surface of the intermediate layer and containing an oxide dielectric material, the substrate, the intermediate layer, and the surface layer being formed into a layered formation, wherein:

the oxide dielectric material is tantalum oxide, aluminum oxide, titanium oxide or tungsten oxide and the ratio of oxide in the surface layer is 70 mol % or greater and the surface layer is provided with holes which pass through the surface layer and one end of each of which reaches the intermediate layer.

2. The electrode for electrolysis according to claim 1, wherein the substrate is a conductive substrate, and the holes do not reach the conductive substrate.

3. The electrode for electrolysis according to claim 1, wherein the noble metal is a platinum group element.

4. The electrode for electrolysis according to claim 1, wherein the intermediate layer and/or the surface layer is constituted of a plurality of layers.

5. The electrode for electrolysis according to claim 1, wherein the oxide is tantalum oxide.

6. The electrode for electrolysis according to claim 5, wherein the ratio of tantalum oxide in the surface layer is 70 mol % or greater.

7. The electrode for electrolysis according to claim 5, wherein the ratio of tantalum oxide in the surface layer is 75 mol % or greater.

8. A method of manufacturing the electrode for electrolysis according to any one of claims 1, 2, 3, 4, 5, and 6, comprising a first step of coating the surface of the substrate with an intermediate layer constituting material for forming the intermediate layer, and thermally treating the substrate and the intermediate layer constituting material to thereby form the intermediate layer on the surface of the substrate; and a second step of coating the surface of the intermediate layer with a surface layer constituting material for forming the surface layer, and thermally treating the substrate, the intermediate layer, and the surface layer constituting material in an oxidizing atmosphere to thereby form the surface layer on the surface of the intermediate layer.

9. The method of manufacturing the electrode for electrolysis according to claim 8, wherein the thermal treatment in the second step is performed at a temperature higher than that of the thermal treatment in the first step.

* * * * *